United States Patent
Ren et al.

(10) Patent No.: US 11,752,823 B2
(45) Date of Patent: Sep. 12, 2023

(54) ACTIVE SUSPENSION SYSTEM, VIBRATION DAMPER AND VIBRATION DAMPING COMPONENT

(71) Applicant: SHENZHEN POLYTECHNIC, Shenzhen (CN)

(72) Inventors: Shaoyun Ren, Shenzhen (CN); Zhijun Deng, Shenzhen (CN); Zhurong Dong, Shenzhen (CN)

(73) Assignee: SHENZHEN POLYTECHNIC, Shenzhen (CN)

( * ) Notice: Subject to any disclaimer, the term of this patent is extended or adjusted under 35 U.S.C. 154(b) by 525 days.

(21) Appl. No.: 16/959,140

(22) PCT Filed: Jul. 24, 2018

(86) PCT No.: PCT/CN2018/096859
§ 371 (c)(1),
(2) Date: Jun. 29, 2020

(87) PCT Pub. No.: WO2019/128207
PCT Pub. Date: Jul. 4, 2019

(65) Prior Publication Data
US 2020/0331315 A1 Oct. 22, 2020

(30) Foreign Application Priority Data
Dec. 29, 2017 (CN) .......................... 201711467870.X

(51) Int. Cl.
*F16F 9/19* (2006.01)
*B60G 17/08* (2006.01)
(Continued)

(52) U.S. Cl.
CPC ......... *B60G 17/0152* (2013.01); *B60G 13/08* (2013.01); *B60G 17/08* (2013.01);
(Continued)

(58) Field of Classification Search
CPC .... B60G 17/0152; B60G 13/08; B60G 17/08; B60G 2202/24; B60G 2206/41;
(Continued)

(56) References Cited

U.S. PATENT DOCUMENTS 3,147,965 A * 9/1964 Mercier ............... B60G 17/033
267/64.19
3,816,028 A * 6/1974 Schouteeten ........... F04B 53/00
417/214
(Continued)

FOREIGN PATENT DOCUMENTS

CN 101639055 A * 2/2010
CN 201953557 U * 8/2011
(Continued)

*Primary Examiner* — Thomas J Williams
*Assistant Examiner* — James K Hsiao
(74) *Attorney, Agent, or Firm* — Cheng-Ju Chiang

(57) ABSTRACT

A vibration damping component, comprising a hydraulic cylinder and a hydraulic motor; The hydraulic oil cylinder comprises an oil storage cylinder and a working cylinder, wherein the working cylinder is internally provided with a first piston piece and is divided into an expansion cavity and a contraction cavity by means of the first piston piece; the expansion connects the oil storage cylinder by means of a first one-way oil discharge; the contraction connects the oil storage cylinder by means of a second one-way oil discharge; the oil storage cylinder is provided thereon with an oil outlet hole; an input end of the hydraulic motor is connected to the oil outlet hole; and an output end of the hydraulic motor is in communication respectively with the expansion by means of a first one-way oil return pipe and with the contraction by means of a second one-way oil return pipe.

14 Claims, 5 Drawing Sheets

(51) Int. Cl.
  *B60G 13/08* (2006.01)
  *B60G 17/015* (2006.01)
  *F16F 9/32* (2006.01)
  *F16F 9/38* (2006.01)
  *F16F 9/43* (2006.01)
  *F16F 9/50* (2006.01)
  *F16H 1/28* (2006.01)
  *F16H 57/02* (2012.01)

(52) U.S. Cl.
  CPC ............ *F16F 9/19* (2013.01); *F16F 9/3214* (2013.01); *F16F 9/3242* (2013.01); *F16F 9/38* (2013.01); *F16F 9/43* (2013.01); *F16F 9/50* (2013.01); *F16H 1/28* (2013.01); *F16H 57/02* (2013.01); *B60G 2202/24* (2013.01); *B60G 2206/41* (2013.01); *B60G 2500/10* (2013.01); *B60G 2800/162* (2013.01); *F16F 2222/12* (2013.01); *F16F 2228/066* (2013.01); *F16F 2230/0023* (2013.01); *F16F 2230/18* (2013.01); *F16F 2234/02* (2013.01); *F16H 2057/02039* (2013.01)

(58) Field of Classification Search
  CPC . B60G 2500/10; B60G 2800/162; F16F 9/19; F16F 9/38; F16F 9/43; F16F 9/50; F16F 9/3242; F16F 2222/12; F16F 2228/066; F16F 2230/18; F16H 1/28; F16H 2057/02039; F16H 57/02
  See application file for complete search history.

(56) References Cited

U.S. PATENT DOCUMENTS

| | | | | |
|---|---|---|---|---|
| 4,271,938 A * | 6/1981 | Berger | ...................... | F16F 9/19 |
| | | | | 188/282.7 |
| 4,743,046 A * | 5/1988 | Schnittger | ................ | F16F 9/46 |
| | | | | 280/5.507 |
| 4,943,083 A * | 7/1990 | Groves | ................... | F16F 9/463 |
| | | | | 280/5.515 |
| 4,986,393 A * | 1/1991 | Preukschat | ............ | B60G 17/08 |
| | | | | 188/266.6 |
| 5,016,908 A * | 5/1991 | Athanas | ............... | B60G 17/018 |
| | | | | 188/266.5 |
| 5,150,916 A * | 9/1992 | Petrofes | ................ | F16F 9/462 |
| | | | | 188/282.4 |
| 5,901,820 A * | 5/1999 | Kashiwagi | ................ | F16F 9/46 |
| | | | | 188/266.6 |
| 6,119,829 A * | 9/2000 | Nakadate | ................ | F16F 9/348 |
| | | | | 188/266.6 |
| 8,783,696 B2 * | 7/2014 | Murakami | ............ | B62K 25/00 |
| | | | | 267/221 |
| 8,978,847 B2 * | 3/2015 | Atsushi | ............... | B60G 17/0416 |
| | | | | 188/266.5 |
| 9,062,737 B2 * | 6/2015 | Hoult | ........................ | F16F 9/26 |
| 9,481,221 B2 * | 11/2016 | Reybrouck | ............... | F16F 9/46 |
| 10,358,010 B2 * | 7/2019 | Boon | ..................... | B60G 21/06 |
| 11,285,775 B2 * | 3/2022 | Bergfeld | ............... | F16F 9/50 |
| 2007/0084687 A1 * | 4/2007 | Foster | ..................... | F16F 9/512 |
| | | | | 188/322.2 |
| 2010/0006362 A1 * | 1/2010 | Armstrong | ........... | B60G 17/015 |
| | | | | 290/1 R |
| 2011/0094807 A1 * | 4/2011 | Pruitt | ..................... | B60L 50/40 |
| | | | | 180/65.6 |
| 2012/0019008 A1 * | 1/2012 | Hughley | .............. | H02K 7/1823 |
| | | | | 290/1 R |
| 2012/0305347 A1 * | 12/2012 | Mori | ..................... | B60G 17/08 |
| | | | | 188/266.2 |
| 2013/0147205 A1 * | 6/2013 | Tucker | ..................... | F03C 1/26 |
| | | | | 290/1 A |
| 2013/0152776 A1 * | 6/2013 | Baumgartner | ......... | G05D 7/014 |
| | | | | 91/165 |
| 2014/0060316 A1 * | 3/2014 | Chen | ....................... | F16F 9/064 |
| | | | | 91/462 |
| 2014/0265170 A1 * | 9/2014 | Giovanardi | ......... | F15B 13/0444 |
| | | | | 280/5.5 |
| 2014/0288776 A1 * | 9/2014 | Anderson | .............. | B60G 13/14 |
| | | | | 701/37 |
| 2015/0224845 A1 * | 8/2015 | Anderson | ............ | B60G 17/019 |
| | | | | 701/37 |
| 2015/0360531 A1 * | 12/2015 | Kim | ..................... | B60G 17/027 |
| | | | | 74/89.33 |
| 2017/0313153 A1 * | 11/2017 | Masamura | ............ | B60G 17/08 |
| 2018/0354335 A1 * | 12/2018 | Harrison | ................ | F16K 11/14 |
| 2020/0032871 A1 * | 1/2020 | Yamashita | ............ | F16F 9/3221 |
| 2020/0200236 A1 * | 6/2020 | Wüstenberg | .......... | F16H 57/082 |

FOREIGN PATENT DOCUMENTS

| | | |
|---|---|---|
| CN | 201953557 U | 8/2011 |
| CN | 104265823 A | 1/2015 |
| CN | 205479087 U | 8/2016 |
| CN | 107939893 A | 4/2018 |
| JP | 2008-8471 A | 1/2008 |
| TW | 201408879 A | 3/2014 |
| WO | WO-2020021500 A1 * | 1/2020 ............... F16F 9/185 |

\* cited by examiner

ACTIVE SUSPENSION SYSTEM, VIBRATION DAMPER AND VIBRATION DAMPING COMPONENT

CROSS REFERENCE TO RELATED APPLICATIONS

The present application is a 35 U.S.C. § 371 National Phase conversion of International (PCT) Patent Application No. PCT/CN2018/096859, filed on Jul. 24, 2018, which claims priority of Chinese Patent Application No. 201711467870.X, filed on Dec. 29, 2017, the disclosure of which is incorporated by reference herein. The PCT International Patent Application was filed and published in Chinese.

FIELD OF THE INVENTION

The invention relates to an active suspension system, a vibration damper and a vibration damping component.

BACKGROUND OF THE INVENTION

The active suspension generally means that the stiffness (elastic force) of the spring and the damping parameter (damping force) of the damping component can be adjusted and changed. The active suspension has been widely used in high-end-passenger-car or commercial-vehicle suspensions due to its good passenger comfort, wheel attachment performance and dynamic load changes caused by vehicle handling. Existing active suspensions include hydraulic (pneumatic) transmission-energy storage-damping suspension, electromagnetic induction energy storage suspension, mechanical transmission+rotary motor electromagnetic suspension and linear motor electromagnetic suspension. The existing active suspension damping components mainly have the following problems:

The hydraulic (pneumatic) transmission energy storage suspension has the advantage of stable hydraulic (pneumatic) transmission, but there is a high-pressure accumulator in the structure, which requires high precision for both the oil sealing and control valve, and increases the additional weights of the accumulator, oil (gas) tube, fuel tanks (gas storage tanks) and etc. have high manufacturing costs and are not practical for most ordinary passenger vehicles.

The principle of the coil-induction energy storage suspension is to use the change of the gap between the iron core coil (EM) and the permanent magnet (PM) to generate a time-varying magnetic flux, thereby generating an alternating induced electromotive force, which can realize charging of the vehicle battery through the rectifier circuit, and simultaneously the battery is used to energize the iron core coil through the control circuit to generate an electromagnetic field, and interact with the magnetic field of the permanent magnet to generate electromagnetic force, which can be equivalent to a damping force control to the traditional active suspension, and realize the vehicle damping function. Due to the different road conditions of the vehicle, the gap that realizes the electromagnetic conversion will change drastically, and even the instantaneous gap will be zero, and collision between the inducing components will occur. The actual structure can only be increased by the gap, and increase the coil winding to increase the size of the structure. This structure is difficult to achieve an energy consumption control to electromagnetic force damping, and vibration energy recovery also has circuit problems, and the efficiency is relatively low.

Gear rack mechanical transmission combined with rotary motor energy recovery damping parts and ball screw mechanical transmission+rotary motor energy recovery damping parts have been widely studied at home and abroad. Both types convert the stretching and compression movement between the car body and the ground into a rotary motion through a mechanism drive (gear rack or ball screw) and connect the rotary motor. The best advantage of this method is that the armature magnetic field and the excitation magnetic field avoid the actual movement of the sprung mass (car body) and the unsprung mass (car axle and car wheel). The magnetic field gap is stable and controllable via the mechanical transmission, it can realize electromagnetic force control and produce equivalent damping vibration, and it also enables vibration energy recovery. When the road conditions of the vehicle are very bad, the two suspensions transmit vibration through the gear rack or the ball screw. There is inherent non-linear motion of the backlash, insufficient mechanical strength, low feed energy efficiency due to mechanical friction, large inertial mass, and poor reliability and durability to withstand long-term vibration shocks, it is easy to mechanical failure, affecting service life, and lack of reliability. Some studies have pointed out that compared with the ball screw method, by the mechanical transmission of the rack and pinion combined with of the rotary motor, the energy recovery efficiency and the structural defects of the vibration-damping components are more obvious.

SUMMARY OF THE INVENTION

Technical Problem

At present, with the advancement of power electronic control technology and permanent magnet materials, linear motor electromagnetic active suspension is considered to be the best solution for future vehicle active suspension design. There are also a lot of researches and applications on linear motor energy recovery and vibration damping components. The suspension uses the mover and stator of the linear motor to connect the vehicle body and the vehicle wheel respectively, trying to directly use the electromagnetic force of the motor to be equivalent to the damping force of the traditional hydraulic damping component to achieve the double targets of vibration reduction and vibration energy recovery. The research literature shows that due to structural limitations of the suspension, the magnetic energy density is not high, and the value range of electromagnetic force is limited. It cannot cover the requirements of damping force, and there are defects in the structural design, structural stress distribution and the stability of the temperature field of the structure under various working conditions. It is difficult to install and it is easy to fail.

Technical Solution

For solving the above technical problems, the invention provides an active suspension system, a vibration damper and a vibration damping component, which have simple and compact structure, stable and reliable performance, durability, and can satisfy active control of damping force and vibration energy recovery of vehicle suspension.

In order to solve the above technical problem, the present invention provides a vibration damping component a hydraulic cylinder and a hydraulic motor; wherein the hydraulic cylinder includes a relatively independent oil storage cylinder and a working cylinder; the working cylinder is provided with a first piston piece and is divided into an expansion chamber and a contraction chamber by the first piston piece; the expansion chamber is in communication with the oil storage cylinder by means of a first one-way oil discharge pipe; the contraction chamber is in communication with the oil storage cylinder by means of a second one-way oil discharge pipe; the oil storage cylinder defines an oil outlet hole; an input end of the hydraulic motor is connected to the oil outlet hole; an output end of the hydraulic motor is in communication respectively with the expansion chamber by means of a first one-way oil return pipe and with the contraction chamber by means of a second one-way oil return pipe; thereby the hydraulic motor can be driven to perform one-way rotation by the first piston piece reciprocating in the working cylinder.

Further, a top end of the oil storage cylinder is sealed by an oil passage coupling; the oil passage coupling defines three or more blind holes in one side thereof towards the oil storage cylinder, where at least one blind hole serves as the oil outlet hole, and two or more blind holes serve as oil return holes; the oil passage coupling defines two blind holes in one side away from the oil storage cylinder, where one blind hole serves as an output hole and the other blind hole serves as an input hole; inside the oil passage coupling, the oil outlet hole communicates with the output hole, and the oil return holes communicate with each other and one of the oil return holes communicates with the input hole; where the hydraulic motor is disposed on a side of the oil passage coupling away from the oil storage cylinder, and an input end of the hydraulic motor is connected to the output hole of the oil passage coupling, and an output end of the hydraulic motor is connected to the input hole of the oil passage coupling, and some oil return holes of the oil passage coupling communicate with the expansion chamber through corresponding numbers of first one-way oil return pipes respectively, and other oil return holes is in communication with the contraction chamber respectively through corresponding numbers of second one-way oil return pipe.

Further, the hydraulic cylinder includes a cylinder body in which a second piston piece is disposed and the cylinder body is divided into the oil storage cylinder and the working cylinder by the second piston piece.

Further, the first piston piece and the second piston piece each include two pistons and a buffer member coupled between the two pistons.

Further, in the second piston piece, a piston disposed adjacent to the first piston piece can reciprocate relative to the cylinder body, and a piston disposed away from the first piston piece can reciprocate relative to the cylinder body or cannot reciprocate relative to the cylinder.

Further, the first one-way oil discharge pipe, the second one-way oil discharge pipe, the first one-way oil return pipe, and the second one-way oil return pipe are all disposed outside the cylinder body.

Further, the outside of the cylinder is provided with an housing for protecting the first one-way oil discharge pipe, the second one-way oil discharge pipe, the first one-way oil return pipe and the second one-way oil return pipe; a first mounting seat and a second mounting seat are disposed at an interval on an outer wall of the housing in a longitudinal direction; a spring is sleeved on the outer wall of the housing, and two ends of the spring respectively abut the first mounting seat and the second mounting seat.

In order to solve the above problems, the present invention provides a vibration damper comprising the vibration damping component according to any one embodiment above, further comprising: a rotary motor mated with a hydraulic motor in the vibration damping component, the rotary motor being drivable by the hydraulic motor for energy recovery; or, the rotary motor being controllable and controlling the hydraulic motor for an active control of damping force.

Further, the vibration damper further includes a planetary gearset and a planetary gearset housing, the planetary gearset including an inner ring gear, a planetary carrier equipped with planetary gears, and a sun gear; the planetary carrier is mounted in the inner ring gear and meshed with the inner ring gear through the planetary gears, and the sun gear meshes with the planetary gears; an outer wall of the inner ring gear is fixedly connected to an inner wall of the planetary gearset housing; one end surface of the planetary gearset housing is fixedly connected with an mounting flange fixed by the rotary motor, and the other end surface of the planetary gearset housing is fixedly connected with a coupling flange which is mounting at one end of the output shaft of the hydraulic motor; and the output shaft of the hydraulic motor is fixedly connected to a shaft of the planetary carrier, and a rotor of the rotary motor is coaxially fixedly connected to the sun gear.

In order to solve the above problems, the present invention provides an active suspension system, comprising the vibration damper according to any of the above embodiments, further comprising: a motor controller, a power source, an ECU, and a sensor; and the rotary motor in the vibration damper is electrically connected to the motor controller, and the motor controller and the sensor are respectively electrically connected to the ECU.

Advantages

The active suspension system, the vibration damper and the vibration damping component of the present invention have the following advantages:

by providing the hydraulic cylinder with one-way flow of oil, and providing the hydraulic motor that is driven by the one-way flow of oil output from the hydraulic cylinder, the hydraulic motor can be driven to perform one-way rotation; the one-way rotational speed of the hydraulic motor can be controlled accordingly, and an active control to the vehicle suspension damping force and vibration energy recovery can be obtained, and the structure is simple and compact, the performance is stable and reliable, and the service life is long.

DETAILED DESCRIPTION OF THE INVENTION

The invention will now be described in detail in conjunction with the drawings and embodiments.

Figure 1:
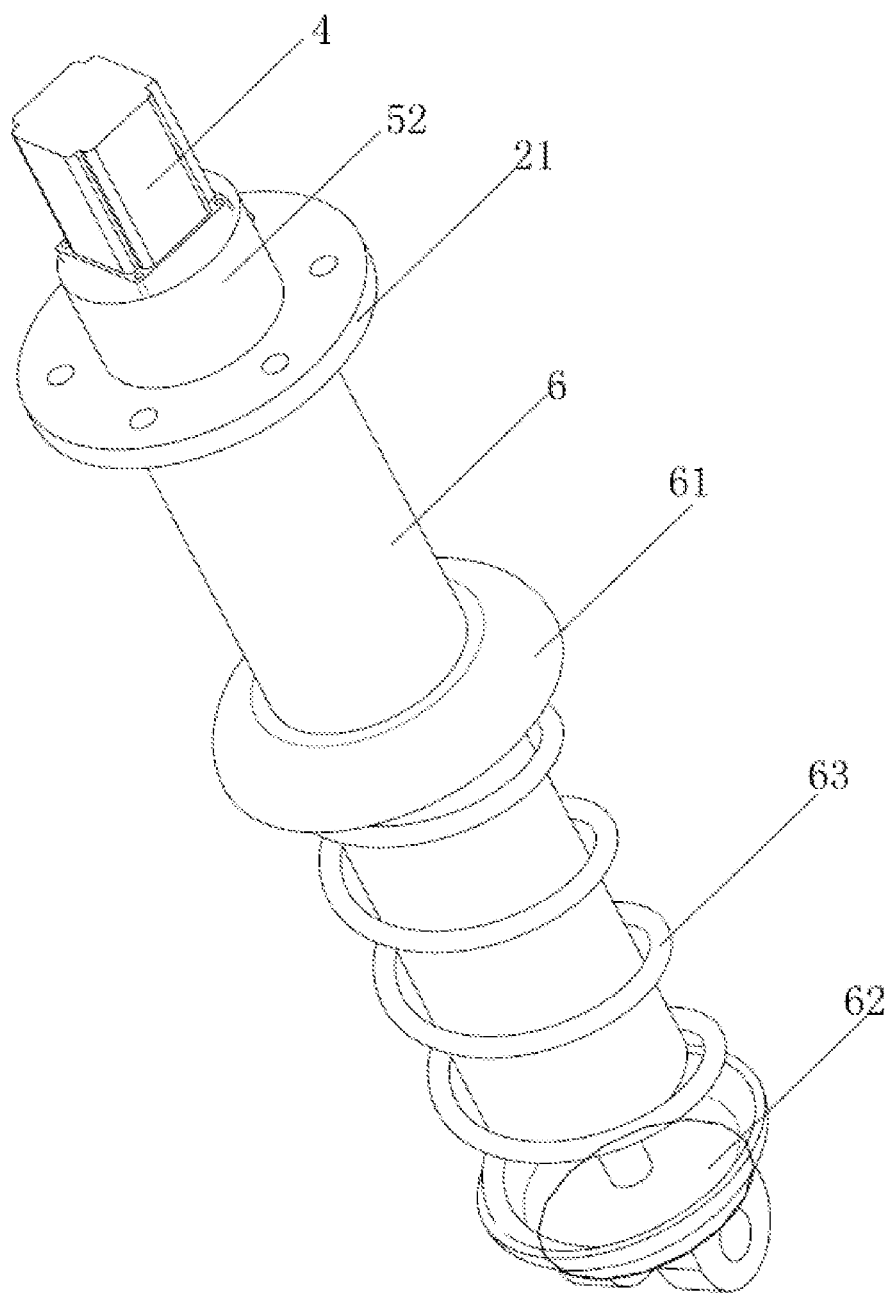
FIG. 1 is a schematic view of a vibration damper of the present invention.
Figure 2:
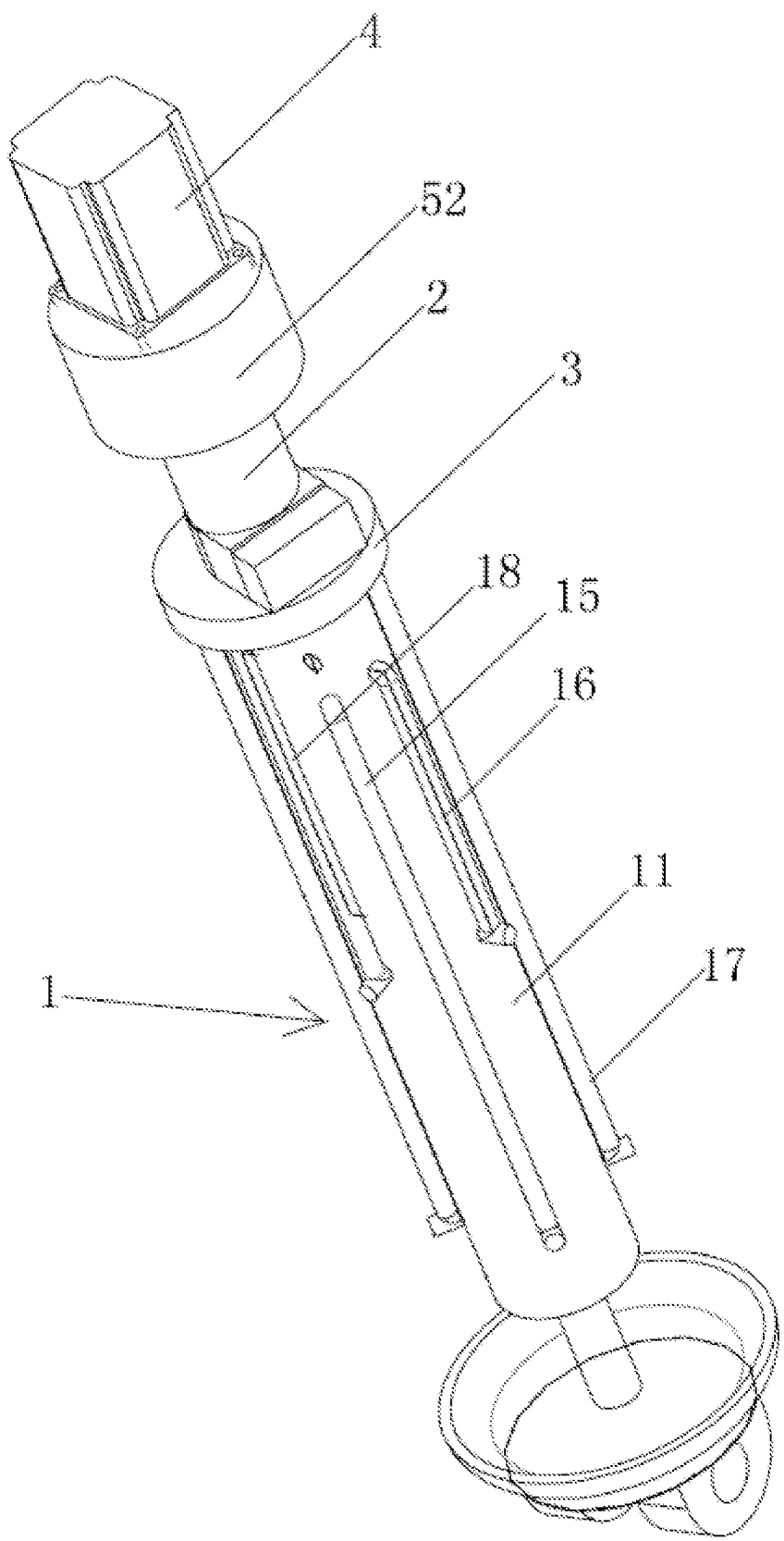
FIG. 2 is a structural schematic view of the vibration damper of FIG. 1 without a coupling flange, a casing and a spring.
Figure 3:
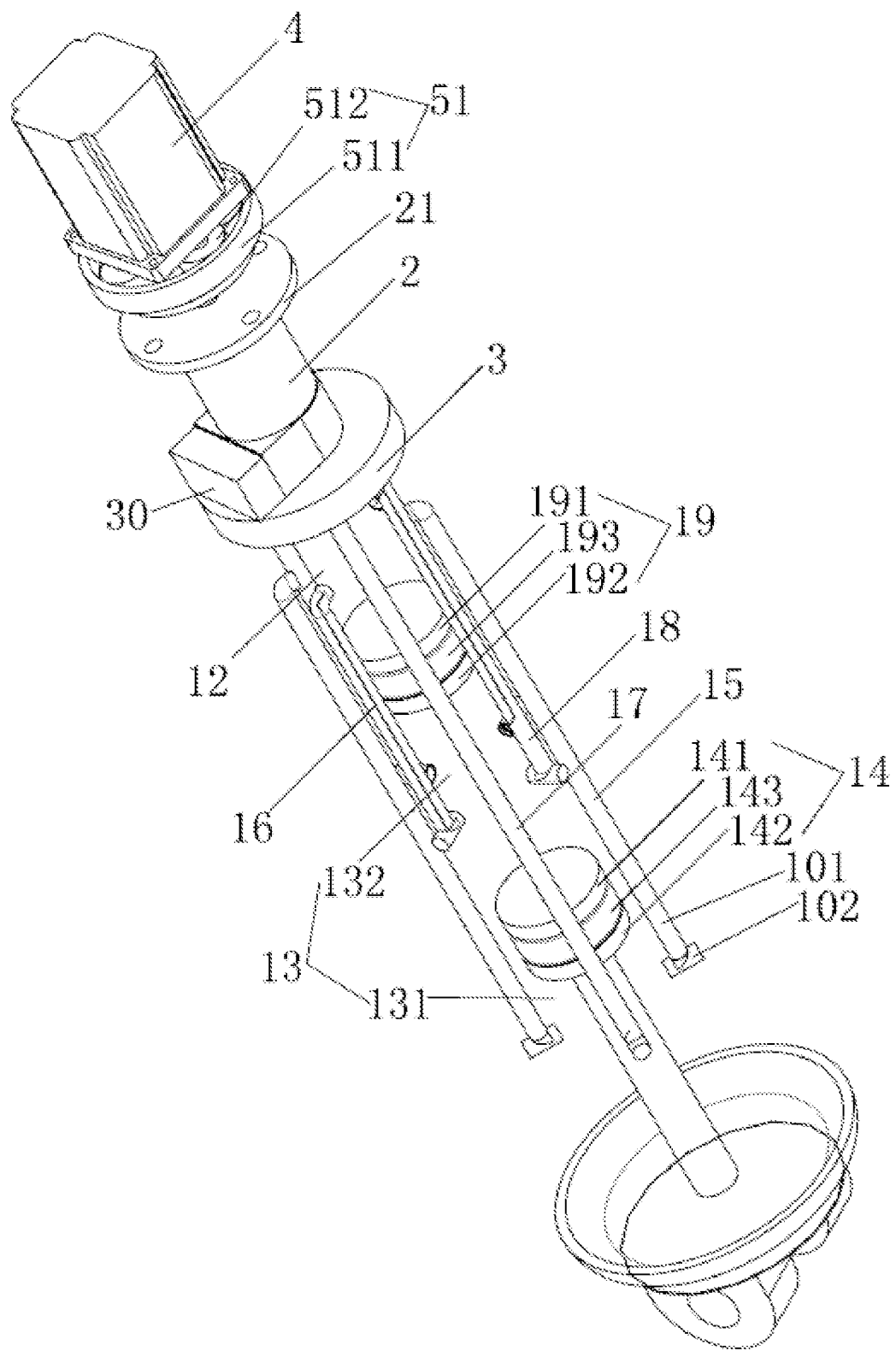
FIG. 3 is a schematic view showing an internal structure of the vibration damper of FIG. 1.

Referring to FIGS. 1 to 3, the present invention provides a vibration damper that includes a vibration damping component. The vibration damping component includes a hydraulic cylinder 1 and a hydraulic motor 2.

Herein, as shown in FIG. 3, the hydraulic cylinder 1 includes an oil storage cylinder 12 and a working cylinder 13 which are relatively independent. The working cylinder 13 is provided with a first piston piece 14 which can be reciprocating in the working cylinder 13, and the first piston piece 14 physically separates the working cylinder 13 into two chambers, that is, an expansion chamber 131 and a contraction chamber 132. The space in which the first piston piece 14 is contracted into the cylinder 13 is the contraction chamber 132. On the contrary, the other space is the expansion chamber 131.

Wherein, the expansion chamber 131 and the oil storage cylinder 12 communicate with each other through one or more first one-way oil discharge pipes 15, and the contraction chamber 132 and the oil storage cylinder 12 are also connected by one or more second one-way oil discharge pipes 16. The first one-way oil discharge pipe 15 and the second one-way oil discharge pipe 16 allow the oil inside the expansion chamber 131 and the contraction chamber 132 only one-way flowing to the oil storage cylinder 12. Wherein, the first one-way oil discharge pipe 15 and the second one-way oil discharge pipe 16 generally adopt a conventional pipe 101 and a one-way valve 102 is added to the pipe 101 to realize one-way circulation of oil. Preferably, the one-way valve 102 employs a mechanical one-way valve, thus eliminating the need for complicated electrical controls.

Further, the oil storage cylinder 12 is provided with an oil outlet hole 31. The hydraulic motor 2 can be mounted on the top end of the oil storage cylinder 12. Herein, the input end of the hydraulic motor 2 is connected to the oil outlet hole 31; and the output end of the hydraulic motor 2 is connected to the expansion chamber 131 through the one or more than one first one-way oil return pipe 17, and is connected to the expansion chamber 131 through the one or more than one second one-way oil return pipe 18. Wherein, the first one-way oil return pipe 17 and the second one-way oil return pipe 18 generally adopt a conventional pipe 101 and a one-way valve 102 is added to the pipe 101 to realize one-way circulation of oil. Preferably, the one-way valve 102 employs a mechanical one-way valve, thus eliminating the need for complicated electrical controls.

By the above configuration, when the first piston piece 14 reciprocates in the working cylinder 13, the flow direction of the oil is the same single direction, so as to change the rough irregular reciprocating motion into the one-way rotation of the hydraulic motor 2, thereby avoiding irregular reciprocating cycles in the speed and acceleration of the existing suspension such as zero speed-positive (acceleration) speed-zero speed-negative (acceleration) speed-zero speed, and also avoiding the infinite variation of equivalent inertial load and other defects. It avoids the problems of motion instability and numerical analysis uncertainty in theoretical research and simulation calculation, and provides a good foundation for reasonable recovery of vibration energy In order not to affect the reciprocating motion of the first piston piece 14, those skilled in the art should understand the first one-way oil discharge pipe 15, the second one-way oil discharge pipe 16, the first one-way oil return pipe 17, and the second one-way oil return pipe 18 should be disposed outside of the storage cylinder 12 and the working cylinder 13 for ease of processing and installation.

The vibration damper also includes a rotary motor 4. The rotary motor 4 can usually be a permanent magnet synchronous motor. The rotary motor 4 cooperates with the hydraulic motor 2. Herein, the rotary motor 4 can be driven by the hydraulic motor 2 to achieve energy recovery, or the rotary motor 4 can control and control the hydraulic motor 2 to operate to obtain an active control of the damping force.

In a preferred embodiment, the rotary motor 4 and the hydraulic motor 2 can be coupled by a planetary gearset 51. The planetary gearset 51 can be a Simpson-type single planetary gearset or a Lavina double planetary gearset. The planetary gearset 51 includes an inner ring gear 511, a planetary carrier (not shown), and a sun gear (not shown). The planetary carrier is provided with a certain number of planet gears 512. The planetary carrier is mounted in the inner ring gear 511 and meshed with the inner ring gear 511 via the planetary gears 512, and the sun gear meshes with the planet gears 512. Further, the outer wall of the inner ring gear 511 is fixedly connected to the inner wall of the planetary gearset housing 52. One end surface of the planetary gearset housing 52 is fixedly connected with a mounting flange fixed by the rotary motor 4, and the other end surface is fixedly connected with a coupling flange 21 which is mounting at one end of the output shaft of the hydraulic motor 2. The output shaft of the hydraulic motor 2 is fixedly connected with the shaft of the planetary carrier, and the rotor of the rotary motor 4 is coaxially fixedly connected with the sun gear. In addition, the coupling flange 21 provided on the hydraulic motor 2 is also used to mount the vibration damper on the vehicle body.

By utilizing the motion characteristics of the compact planetary gearset 51, the output shaft speed of the hydraulic motor 2 is doubled. As energy recovery, the relative magnetic fields of the stator and the rotor in the rotary motor 4 are increased, and the induced electromotive force value is increased, which provides good conditions for energy recovery. The motor controller 81 supplies electric energy to the rotary motor 4, and the electromagnetic torque generated by the magnetic field of the rotary motor 4 is amplified by the planetary gearset 51 by a certain multiple, and then the rotational speed of the output shaft of the hydraulic motor 2 is controlled, that is, the oil pressure in the working cylinder 13 (i.e., the expansion chamber 131 and the contraction chamber 132) and in the reservoir 12 can be indirectly controlled, equivalently, the damping force change of the hydraulic vibration damper in the active suspension is controlled.

Figure 4:
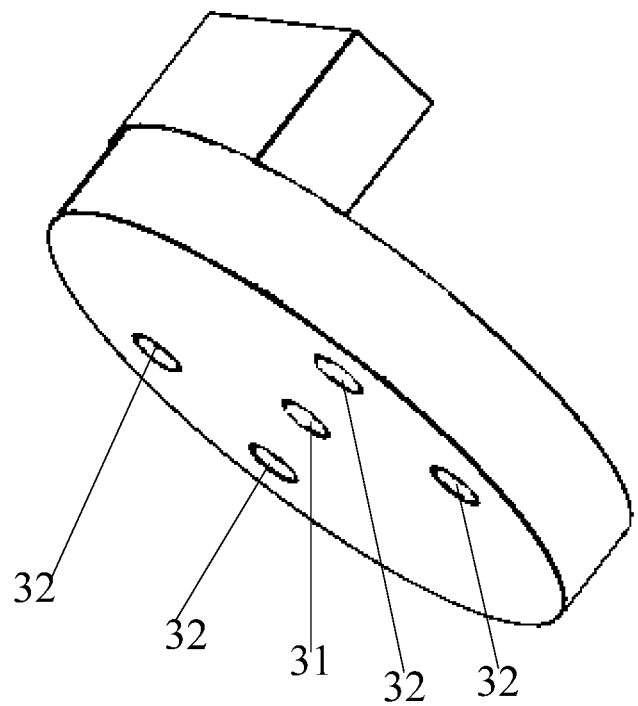
FIG. 4 is a schematic view of the oil passage coupling shown in FIG. 1.
Figure 5:
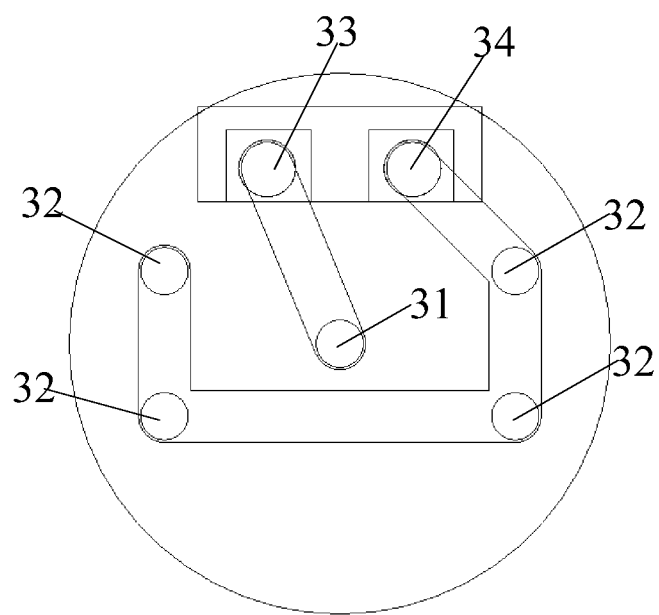
FIG. 5 is a schematic view showing the connection of holes of the oil passage coupling shown in FIG. 4.

In a preferred embodiment, referring to FIGS. 4 and 5, the top end of the reservoir 12 is sealed by an oil passage coupling 3. The oil passage coupling 3 defines three or more blind holes in one side thereof toward the oil storage cylinder 12, where at least one blind hole serves as the oil outlet hole 31, and two or more blind holes serves as the oil return hole 32. On the other hand, the oil passage coupling 3 defines two blind holes in the other side thereof away from the oil storage cylinder 12, where one blind hole serves as the output hole 33 and the other blind hole serves as the input hole 34. The oil outlet hole 31 communicates with the output hole 33, the oil return hole 32 communicates with each other, and one of the oil return holes 32 communicates with the input hole 34. For example, the oil return holes 32 can be connected in series. In addition, all of the output hole 33 and the input hole 34 may be located within a connector 30 provided on the oil passage coupling 3 to facilitate sealing the input end and the output end of the hydraulic motor 2.

The hydraulic motor 2 is disposed on the side of the oil passage coupling 3 away from the oil storage cylinder 12, the input end of the hydraulic motor 2 is connected to the output hole 33 of the oil passage coupling 3, and the output end of the hydraulic motor 2 is connected to the input holes 34 of the oil passage coupling 3. Some oil return holes 32 of the oil passage coupling 3 communicate with the expansion chamber 131 through corresponding numbers of first one-way oil return pipes 17 respectively, and other oil return holes 32 communicate with the contraction chamber 132 respectively through corresponding numbers of the second one-way return piped 18.

Through the above-mentioned arrangement of the oil passage couplings 3, especially the positions of the functional holes, the installation and arrangement of the pipe network can be simplified, so that the overall structure is simple.

In a preferred embodiment, the hydraulic cylinder 1 includes a cylinder body 11. The cylinder body 11 can generally be a cylindrical body 11. A second piston piece 19 is disposed in the cylinder body 11, and the cylinder body 11 is physically separated into two spaces by the second piston piece 19, that is, the oil storage cylinder 12 and the working cylinder 13. The oil storage cylinder 12 and the working cylinder 13 are formed in the same cylinder body 11 and linearly arranged, and such structure is simpler. Of course, the oil storage cylinder 12 and the working cylinder 13 can also be formed by two non-linearly arranged and independent cylinder bodies 11.

In a preferred embodiment, the first piston piece 14 includes two pistons 141, 142 and a buffer member 143 coupled between the two pistons 141, 142. The buffer member 143 is preferably a solid rubber ring. The first piston piece 14 adopts the above structure, and the cylinder pressure formed by the first piston piece 14 can smoothly response the actual suspension wheel and body vibration, thereby avoiding the rough characteristics directly observed by the mechanical mechanism in the existing suspension research, thereby avoiding vacuum and oil replenishment problems in the oil chambers (specifically, the expansion chamber 131 and the contraction chamber 132).

In another preferred embodiment, the second piston piece 19 can also include two pistons 191, 192 and a buffer member 193 coupled between the two pistons 191, 192. The buffer member 193 is preferably a solid rubber ring. The second piston piece 19 adopts the above structure, and also helps to avoid vacuum and oil replenishment problems in the oil chamber.

Further, in the second piston piece 19, the piston 192 disposed adjacent to the first piston piece 14 can reciprocate relative to the cylinder body 11, and the piston 191 disposed away from the first piston piece 14 can reciprocate or not reciprocate relative to the cylinder body 11. Wherein, the piston 192 disposed adjacent to the first piston piece 14 and reciprocable relative to the cylinder body 11 helps to avoid vacuum and oil replenishment problems in the oil chamber; the other piston 191 can help buffer vibration when reciprocating relative to the cylinder body 11, while can help recover energy when fixed relative to the cylinder body 11, which can be set as required.

In a specific embodiment, a housing 6 is further disposed on the outer side of the cylinder body 11. Specifically, the housing 6 can be fixed to the coupling flange 21 described above. The housing 6 covers the first one-way oil discharge pipe 15, the second one-way oil discharge pipe 16, the first one-way oil return pipe 17, and the second one-way oil return pipe 18 inside to protect them; and the outer wall of the housing 6 is further disposed with a first mounting seat 61 and a second mounting seat 62 at an interval along the longitudinal direction thereof. A spring 7 is sleeved on the outer wall of the housing 6 and the two ends of the spring 7 are respectively abutted between the first mounting seat 61 and the second mounting seat 62.

The present invention also provides a vibration damping component according to the above embodiments, the description will not be repeated here.

Figure 6:
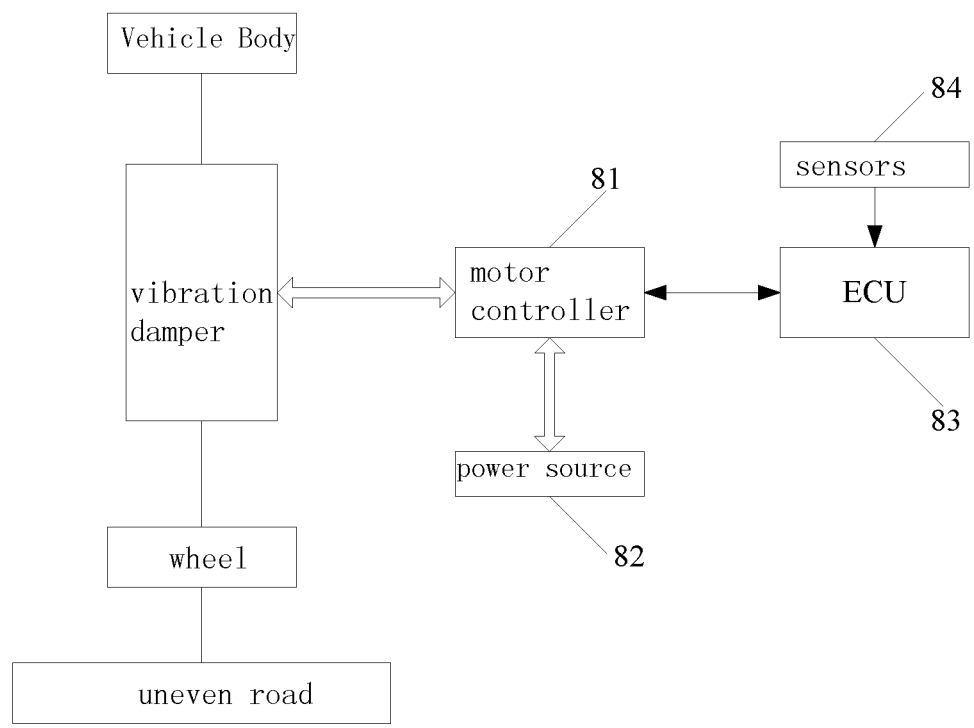
FIG. 6 is a circuit diagram of an active suspension system of the present invention.

In addition, the present invention also provides an active suspension system. As shown in FIG. 6, and referring to FIG. 1 to FIG. 3 together, the active suspension system includes the vibration damper according to the above embodiments, and further includes: a motor controller 81, a power source 82, an ECU (engine control unit) 83, and a certain number of sensors 84. The rotary motor 4 and the power source 82 of the vibration damper are electrically connected to the motor controller 81 respectively, and the ECU 83 is electrically connected to the motor controller 81 and the sensor element 84 respectively. In use, the vibration damper is mounted between the vehicle body and the vehicle wheel.

When the vehicle is traveling on an uneven road, the sensors 84 senses the positions, speeds, and accelerations of the vehicle body and vehicle wheels, and the motor controller 81 controls the rotary motor 4 in different strategies (which needs to combine vehicle comfort and power (drive and braking) and maneuverability considerations), to achieve a precise control to the electromagnetic force (torque) in the rotary motor 4 by the motor controller 81, thereby realizing the ideal active suspension joint control function of the vehicle front, rear, left, and right.

The active suspension system of the invention not only can be applicable for vibration damping and energy-feeding control of the automobile suspensions, but also can be extended to the vibration damping and energy recovery in the fields of industrial and civil products, such as vibration reduction of the bridge, vibration reduction of the building, fitness equipment vibration reduction and other aspects.

The active suspension system, the vibration damper and the vibration damping component of the present invention have the following advantages:

by providing the hydraulic cylinder 1 with one-way flow of oil, and providing the hydraulic motor 2 that is driven by the one-way flow of oil output from the hydraulic cylinder 1, the hydraulic motor 2 can be driven to perform one-way rotation; the one-way rotational speed of the hydraulic motor 2 can be controlled accordingly, and an active control to the vehicle suspension damping force and vibration energy recovery can be obtained, and the structure is simple and compact, the performance is stable and reliable, and the service life is long.

The above is only the embodiment of the present invention, and is not intended to limit the scope of the invention, and the equivalent structure or equivalent process transformation made by the specification and the drawings of the present invention may be directly or indirectly applied to other related technical fields. The same is included in the scope of patent protection of the present invention.

What is claimed is:

1. A vibration damping component, comprising:
   a hydraulic cylinder and a hydraulic motor;
   wherein the hydraulic cylinder includes a relatively independent oil storage cylinder and a working cylinder; the working cylinder is provided with a first piston piece and is divided into an expansion chamber and a contraction chamber by the first piston piece; the expansion chamber is in communication with the oil storage cylinder by means of a first one-way oil discharge pipe;

the contraction chamber is in communication with the oil storage cylinder by means of a second one-way oil discharge pipe; the oil storage cylinder defines an oil outlet hole; an input end of the hydraulic motor is connected to the oil outlet hole; an output end of the hydraulic motor is in communication respectively with the expansion chamber by means of a first one-way oil return pipe and with the contraction chamber by means of a second one-way oil return pipe; thereby the hydraulic motor can be driven to perform one-way rotation by the first piston piece reciprocating in the working cylinder; the hydraulic cylinder includes a cylinder body in which a second piston piece is disposed and the cylinder body is divided into the oil storage cylinder and the working cylinder by the second piston piece; the first piston piece and the second piston piece each include two pistons and a buffer member coupled between the two pistons.

2. The vibration damping component according to claim 1, wherein:
in the second piston piece, one of the two pistons disposed adjacent to the first piston piece can reciprocate relative to the cylinder body, and the other of the two pistons disposed away from the first piston piece can reciprocate relative to the cylinder body or cannot reciprocate relative to the cylinder.

3. The vibration damping component according to claim 1, wherein:
the first one-way oil discharge pipe, the second one-way oil discharge pipe, the first one-way oil return pipe, and the second one-way oil return pipe are all disposed outside the cylinder body.

4. The vibration damping component according to claim 3, wherein:
the outside of the cylinder is provided with an housing for protecting the first one-way oil discharge pipe, the second one-way oil discharge pipe, the first one-way oil return pipe and the second one-way oil return pipe; a first mounting seat and a second mounting seat are disposed at an interval on an outer wall of the housing in a longitudinal direction; a spring is sleeved on the outer wall of the housing, and two ends of the spring respectively abut the first mounting seat and the second mounting seat.

5. The vibration damping component according to claim 1, wherein:
the buffer member is a solid rubber ring.

6. The vibration damping component according to claim 1, wherein:
the cylinder body is cylindrical.

7. The vibration damping component according to claim 1, wherein:
the oil storage cylinder and the working cylinder are formed in the same cylinder body and linearly arranged.

8. The vibration damping component according to claim 1, wherein:
the oil storage cylinder and the working cylinder are respectively two non-linearly arranged and independent cylinders.

9. A vibration damper, comprising:
the vibration damping component of claim 1; and
a rotary motor mated with a hydraulic motor in the vibration damping component, the rotary motor being drivable by the hydraulic motor for energy recovery; or, the rotary motor being controllable and controlling the hydraulic motor for an active control of damping force.

10. The vibration damper according to claim 9, wherein:
in the second piston piece, one of the two pistons disposed adjacent to the first piston piece can reciprocate relative to the cylinder body, and the other of the two pistons disposed away from the first piston piece can reciprocate relative to the cylinder body or cannot reciprocate relative to the cylinder;
the first one-way oil discharge pipe, the second one-way oil discharge pipe, the first one-way oil return pipe, and the second one-way oil return pipe are all disposed outside the cylinder body;
the outside of the cylinder is provided with an housing for protecting the first one-way oil discharge pipe, the second one-way oil discharge pipe, the first one-way oil return pipe and the second one-way oil return pipe; a first mounting seat and a second mounting seat are disposed at an interval on an outer wall of the housing in a longitudinal direction; a spring is sleeved on the outer wall of the housing, and two ends of the spring respectively abut the first mounting seat and the second mounting seat.

11. A vibration damping component, comprising:
a hydraulic cylinder and a hydraulic motor;
wherein the hydraulic cylinder includes a relatively independent oil storage cylinder and a working cylinder; the working cylinder is provided with a first piston piece and is divided into an expansion chamber and a contraction chamber by the first piston piece; the expansion chamber is in communication with the oil storage cylinder by means of a first one-way oil discharge pipe; the contraction chamber is in communication with the oil storage cylinder by means of a second one-way oil discharge pipe; the oil storage cylinder defines an oil outlet hole; an input end of the hydraulic motor is connected to the oil outlet hole; an output end of the hydraulic motor is in communication respectively with the expansion chamber by means of a first one-way oil return pipe and with the contraction chamber by means of a second one-way oil return pipe; thereby the hydraulic motor can be driven to perform one-way rotation by the first piston piece reciprocating in the working cylinder;
a top end of the oil storage cylinder is sealed by an oil passage coupling;
the oil passage coupling defines three or more blind holes in one side thereof towards the oil storage cylinder, where at least one blind hole serves as the oil outlet hole, and two or more blind holes serve as oil return holes;
the oil passage coupling defines two blind holes in one side away from the oil storage cylinder, where one blind hole serves as an output hole and the other blind hole serves as an input hole;
inside the oil passage coupling, the oil outlet hole communicates with the output hole, and the oil return holes communicate with each other and one of the oil return holes communicates with the input hole;
where the hydraulic motor is disposed on a side of the oil passage coupling away from the oil storage cylinder, and an input end of the hydraulic motor is connected to the output hole of the oil passage coupling, and an output end of the hydraulic motor is connected to the input hole of the oil passage coupling, and some oil return holes of the oil passage coupling communicate with the expansion chamber through corresponding numbers of first one-way oil return pipes respectively, and other oil return holes is in communication with the contraction chamber respectively through corresponding numbers of second one-way oil return pipe.

12. A vibration damper, comprising:

the vibration damping component of claim 11; and a rotary motor mated with a hydraulic motor in the vibration damping component, the rotary motor being drivable by the hydraulic motor for energy recovery; or, the rotary motor being controllable and controlling the hydraulic motor for an active control of damping force.

13. A vibration damper, comprising:

a vibration damping component; and a rotary motor mated with a hydraulic motor in the vibration damping component, the rotary motor being drivable by the hydraulic motor for energy recovery; or, the rotary motor being controllable and controlling the hydraulic motor for an active control of damping force;

where the vibration damping component comprises:

a hydraulic cylinder and the hydraulic motor;

wherein the hydraulic cylinder includes a relatively independent oil storage cylinder and a working cylinder; the working cylinder is provided with a first piston piece and is divided into an expansion chamber and a contraction chamber by the first piston piece; the expansion chamber is in communication with the oil storage cylinder by means of a first one-way oil discharge pipe; the contraction chamber is in communication with the oil storage cylinder by means of a second one-way oil discharge pipe; the oil storage cylinder defines an oil outlet hole; an input end of the hydraulic motor is connected to the oil outlet hole; an output end of the hydraulic motor is in communication respectively with the expansion chamber by means of a first one-way oil return pipe and with the contraction chamber by means of a second one-way oil return pipe; thereby the hydraulic motor can be driven to perform one-way rotation by the first piston piece reciprocating in the working cylinder;

the vibration damper further includes a planetary gearset and a planetary gearset housing, the planetary gearset including an inner ring gear, a planetary carrier equipped with planetary gears, and a sun gear;

the planetary carrier is mounted in the inner ring gear and meshed with the inner ring gear through the planetary gears, and the sun gear meshes with the planetary gears;

an outer wall of the inner ring gear is fixedly connected to an inner wall of the planetary gearset housing; one end surface of the planetary gearset housing is fixedly connected with an mounting flange fixed by the rotary motor, and the other end surface of the planetary gearset housing is fixedly connected with a coupling flange which is mounting at one end of the output shaft of the hydraulic motor; and the output shaft of the hydraulic motor is fixedly connected to a shaft of the planetary carrier, and a rotor of the rotary motor is coaxially fixedly connected to the sun gear.

14. An active suspension system, comprising:

the vibration damper of claim 13;

a motor controller;

a power source;

an ECU (engine control unit); and a sensor;

wherein the rotary motor in the vibration damper and the power source are respectively electrically connected to the motor controller, and the motor controller and the sensor are respectively electrically connected to the ECU.

* * * * *